United States Patent
Geurts et al.

(10) Patent No.: US 8,400,399 B2
(45) Date of Patent: Mar. 19, 2013

(54) TORCH

(75) Inventors: Lucas Jacobus Franciscus Geurts, Eindhoven (NL); Vincentius Paulus Buil, Eindhoven (NL); Rik Remco Wesselink, Eindhoven (NL); Bas Groenendaal, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/133,986

(22) PCT Filed: Dec. 11, 2009

(86) PCT No.: PCT/IB2009/055682
§ 371 (c)(1),
(2), (4) Date: Jun. 10, 2011

(87) PCT Pub. No.: WO2010/070559
PCT Pub. Date: Jun. 24, 2010

(65) Prior Publication Data
US 2011/0263305 A1 Oct. 27, 2011

(30) Foreign Application Priority Data
Dec. 18, 2008 (EP) .................................. 08172184

(51) Int. Cl.
*G06F 3/033* (2006.01)

(52) U.S. Cl. .................... 345/158; 340/323 R; 446/484

(58) Field of Classification Search .............. 463/25–42; 345/158; 340/323 R; 446/484
See application file for complete search history.

(56) References Cited

U.S. PATENT DOCUMENTS

| | | | |
|---|---|---|---|
| 6,967,566 B2* | 11/2005 | Weston et al. | 340/323 R |
| 7,850,527 B2* | 12/2010 | Barney et al. | 463/37 |
| 7,878,905 B2* | 2/2011 | Weston et al. | 463/39 |
| 8,089,458 B2* | 1/2012 | Barney et al. | 345/158 |
| 2002/0058459 A1* | 5/2002 | Holt | 446/484 |
| 2002/0063655 A1* | 5/2002 | Aoyama | 342/357.13 |
| 2004/0095759 A1* | 5/2004 | Koch et al. | 362/205 |
| 2008/0014835 A1* | 1/2008 | Weston et al. | 446/484 |
| 2009/0051653 A1* | 2/2009 | Barney et al. | 345/158 |

FOREIGN PATENT DOCUMENTS

WO 2004087271 A1 10/2004

* cited by examiner

*Primary Examiner* — Masud Ahmed

(57) ABSTRACT

The invention relates to a location based gaming device. The gaming device comprises an elongated handheld body and a location control unit arranged in the body. The location control unit outputs location data. A light unit is arranged at a distal side of the body. A controller is adapted to control said light unit, the controller comprising a memory to store track data. The controller is arranged to change a light characteristic between an on track and an off track mode depending on a proximity function between the track data and the compass directional data and/or location data. Accordingly a device is provided that can provide intuitive direction indications, which may be interpretable by players of younger ages.

15 Claims, 3 Drawing Sheets

TORCH

FIELD OF INVENTION

The invention relates to a location based gaming device.

DESCRIPTION OF THE PRIOR ART

Location devices have currently become a standard feature for many applications. As is well known, such devices are configured to calculate an earth coordinate position based on reception of wireless signals from sources with predetermined positions, in particular, signals received from geo stationary satellites (global positioning systems). A trend has become visible to use these devices in games. For instance, it is known to devise tracking routes and give the players hints on directions, using a location device. Also it is known to change playing modalities of such location devices based on a specific location.

US2008/0014835 discloses an interactive 'wand' including an RF transmitter. It may be use to activate light effects. US2004/0095759 discloses a flashlight including GPS functionality. A problem is that present location based games are difficult to play for the younger aged.

SUMMARY OF THE INVENTION

In one aspect, the invention aims to provide a location based gaming device providing intuitive direction indications, which may be interpretable more easily, in particular for players of younger ages. In another aspect, the invention regards a gaming device that is adaptable for a variety of different game concepts. According to an aspect of the invention, a location based gaming device is provided comprising a body and a location control unit arranged in the body. The location control unit outputs location data. A light unit is provided and a controller is adapted to control said light unit, the controller comprising a memory to store track data. The controller is arranged to change a light characteristic between an on track and an off track mode depending on a proximity function between the track data and the compass directional data and/or location data. Accordingly a device is provided that can provide intuitive direction indications, which may be interpretable by players of younger ages.

In a preferred embodiment the body is an elongated proximally handheld body wherein a light unit is arranged at a distal side of the body, the body further comprising an electronic compass unit, arranged to output compass directional data; and wherein the controller further controls the light unit as a function of stored track directional data.

It is to be noted that patent document WO 2004/087271 discloses a magical wand playing device allowing play participants to electronically interact with their surrounding play environment. Participants could experience an illusion of practicing, performing and mastering magic. The playing device comprises tilt sensors to detect movement of the device and short range communication RF to interact with the player and items in the play environment. Through the RF communication the items in the play environment can receive signals from the wand. The items in the play environment of the magical wand play device disclosed in WO 2004/087271 can react to the magical wand commands by e.g. turn on a light of change a lighting effect. The play device disclosed in WO 2004/087271 is not arranged to process location data and/or to provide direction indications.

It is further to be noted that US patent application US 2002/0058459 A1 discloses a toy wand comprising a light, which light is to change based on the measurement of motions of the wand operator whereby a specific set of motions causes a pre-specified light changes. The toy wand disclosed in US 2002/0058459 A1 is not arranged to process location data and/or to provide direction indications.

It is further to be noticed that US patent application US 2002/0063655 A1 discloses a GPS receiver adapted to have a game function, allowing the user to play games based on a combination of GPS satellite locations and the user's location. To achieve the game's objectives the user has to change his position. During play, the GPS receiver does not indicate to the user in an intuitive manner in which direction he has to change his position as it is part of the game that the user works out his approach himself.

BRIEF DESCRIPTION OF THE FIGURES

The invention will be further elucidated in the figures.

DETAILED DESCRIPTION OF THE EMBODIMENTS

Figure 1:
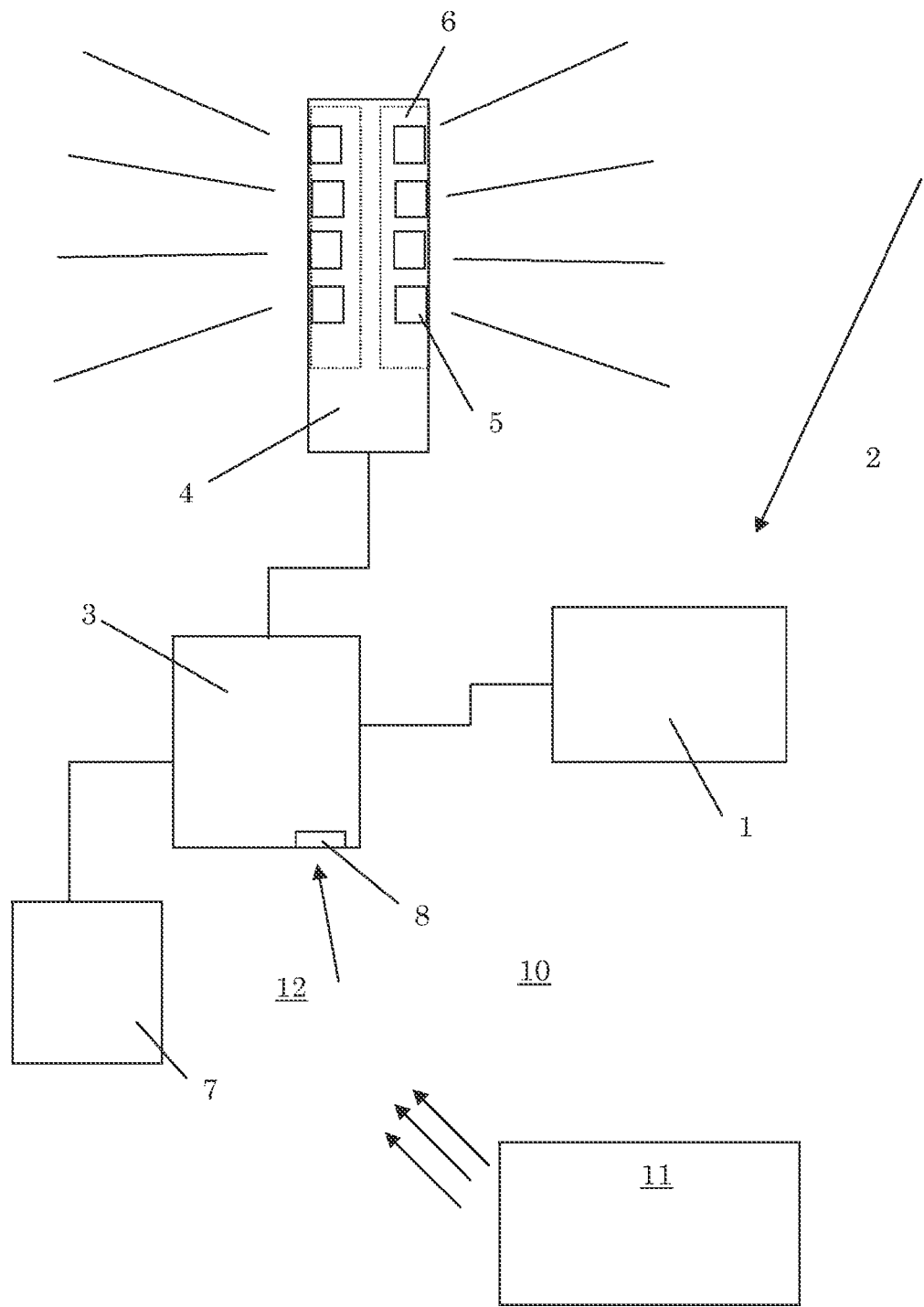
FIG. 1 shows an embodiment according to the invention.

Turning to FIG. 1, a schematic drawing is shown of a location based gaming device. In particular the gaming device 10 is shown to comprise a location control unit 1, arranged to output location data. Typically, such a location control unit 1 may be provided by a global positioning system unit, known in the art, which receives location information from geostationary signals 2. However, other positioning signals, including radio signals etc. may be used to receive location information. The location control unit is communicatively connected to a controller 3 and a light unit 4. The light unit 4 comprises light sources 5, which may display a light characteristic, controlled by controller 3, such as light color, intensity and light pattern. As an example of a change of a light characteristic controller 3 is adapted to provide, for each light source 5, a color transition. Herein, a color transition will be defined as a change in color states of the light source. A color state may be defined by a specific CIE XYZ coordinate, or coordinated in any derived color space, e.g. an RGB combination including white and amber (LED) light sources. This defines the perceived coloring of the light, in addition to a controlled intensity of the respective RGB sources 5 arranged in the light unit 4. Otherwise, the light source 5 may vary the radiated wavelength, to generate a specific color in the visible light spectrum. Using high colored brightness LEDs, including white light, color states of substantially the entire visible color spectrum can be generated within a single visual segment 6 by light sources 5. A memory 7 is coupled to the controller 3 to store track data, which may be prestored or received via a data port 8 (WIFI, infrared, USB, GPRS, UMTS or other digital connection). In addition, other data, such as game data or audio data may be stored, to be accessed by the controller 3. The controller may further comprise user interface, such as a controller switch, a knob etc. to, further comprising a controller switch and/or a controller data port to select a number of controller game modes.

The gaming device functions as follows:
The location control unit 1 outputs location data to the controller 3. The controller 3 calculates a proximity function indicating whether the location data match with the track data prestored in the memory 7. For instance, if a user is within a predetermined range of a certain track, this may be regarded as 'on track', whereas, if the user is more than a predetermined distance, for instance several tens of meters, away from the track, this may be regarded as 'off track'. Thus, the memory may prestore a sequence of locations, which may together form a track, and a sequence of directions, which may indicate a preference direction to move between the locations, and the controller 3 may be arranged to calculate a proximity function, and further change a light characteristic, such as a light color, a light intensity or light pattern, to signal an outcome of the proximity calculation. The following lighting behavior may be illustrative (in any particular combination):

The controller 3 is arranged to provide full lighting intensity when the device is on route and decreasing intensity when leaving route;

The controller 3 is arranged to change color depending on directions, e.g., green color when right direction, red color when wrong;

The controller 3 is arranged to indicate a distance from the goal: e.g., blinking slowly when far from end goal, and faster when close;

The controller 3 is arranged to indicate a proximity of target places: e.g., fast change of colors when close to special place; or The color is arranged to indicate a gaming response: e.g., flash certain color when 'picking up' certain object.

A computing device 11 may be arranged, preferably communicating via signals 12, for example, via GSM, UMTS, GPRS or the like. The computing device may function as a central game controller, typically communicating with several of gaming devices 10, and arranged to compute at least a location of the gaming device, for example to project it on a digital map. Although the illustrated embodiment shows a one-way communication between computing device 11, in an alternative embodiment the communication unit is a two way communication unit. It is possible to arrange the computing device to instruct the controller of the gaming device. This functionality may be used to further enhance the gaming possibilities, for example, to give an alert that torches are in the vicinity of each other, or that a certain person has performed a predetermined action with one of the gaming devices. The computing device may be a central unit but may also be arranged in (one of) the gaming devices for example, functioning in a master slave relation. In the latter case any gaming device may be arranged to function as a master computing device and/or slave computing device. However, a computing device may also be formed as a functional unit that is distributed over a plurality of gaming devices.

Figure 2:
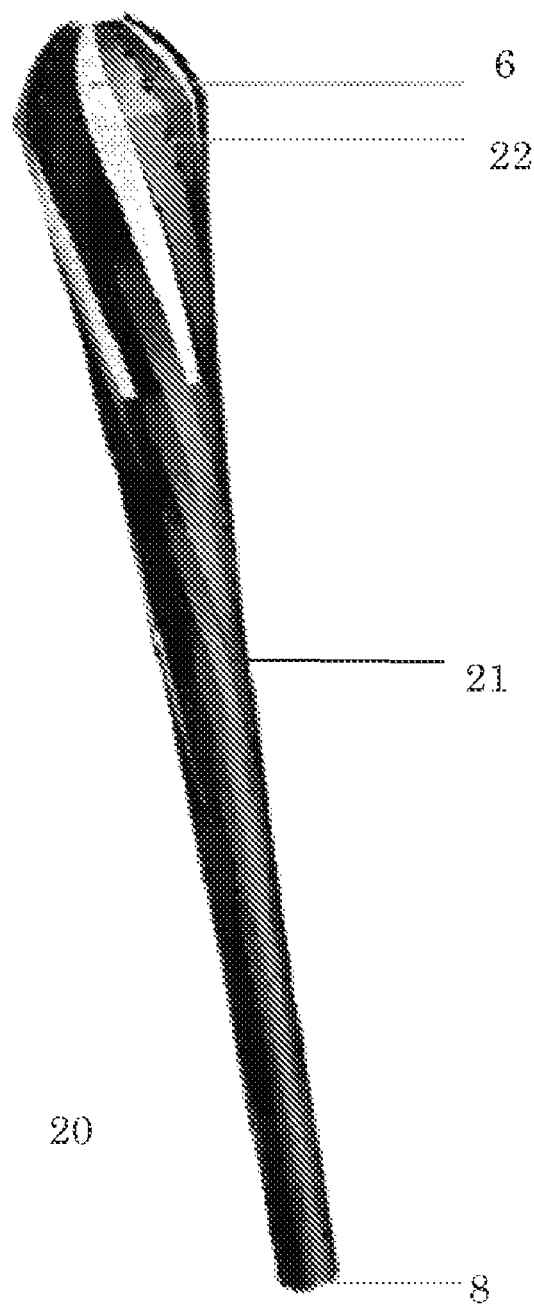
FIG. 2 shows a further embodiment according to the invention.

As shown in FIG. 2, in an embodiment, the form of the torch 20 is formed as an elongate hand held body 21 in the form of a cylinder or inverted cone-shaped having a hand grip on a proximal side and having on the distal side a plurality of visually distinct lighting segments 6. The segments 6 may be formed optically, by focusing optics confining light of a source to a visually distinct segments. It is possible to provide any number of segments 6. The segments 6 are positioned around a central body axis. In each segment 6 a cluster of LEDs (see FIG. 1) may be installed with different colors. Alternatively, other light sources, such as an incandescent light source may also be used or any other multiprimary light source, or color temperature adjustable light source. Of course, also monochrome LEDs can provide a light response.

Figure 3:
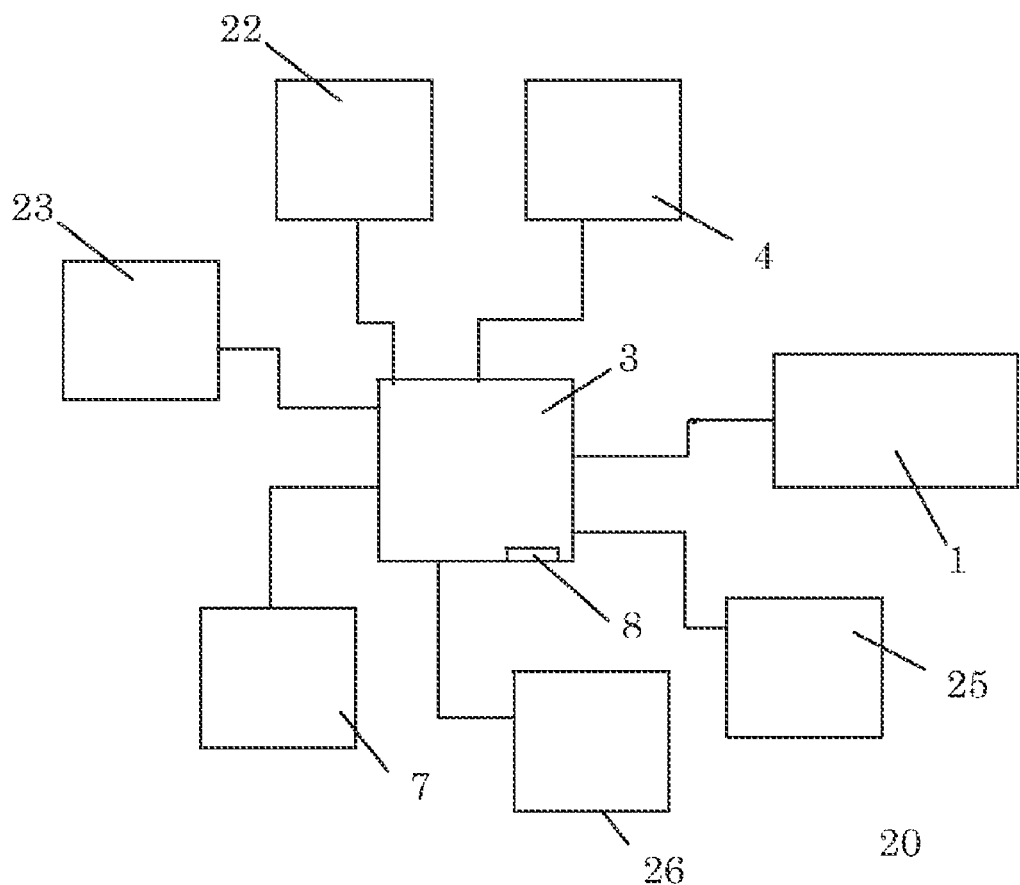
FIG. 3 shows a system diagram of the embodiment of FIG. 2.

The system functionality of the FIG. 2 is further exemplified in FIG. 3. The system elements of FIG. 1 are indicated but not repeated. The device 20 may further comprise a gesture recognition module 26 for detecting predefined gestures; the controller 3 is further arranged to control the light characteristic as a function of a detected gesture. Thus, for instance, by 'picking up' items, or by 'waving' the torch, or by 'throwing a spell', different sensory responses can be activated by the controller 3. In the example of FIG. 2, the gaming device 20 comprises an electronic compass unit 25, arranged to output compass directional data to controller 3. The handheld elongated body facilitates pointing the compass in a direction, to further identify whether a user is heading on a right track. To promote reliable indication of the direction irrespective of angular tilt of the body, a plurality of compass units may be arranged at an angle respective to each other, and wherein the controller 3 is arranged to select a compass unit that is oriented in a functional working condition. For instance, by pointing the device 20 in different directions, the controller 3 may be arranged to control the light unit response as a function of stored track directional data. Thus, when pointing the device 20 in the right direction according to a prestored 'on track direction', a specific 'on track' color such as green may be shown; and when the direction is wrong, the 'off track' color, such as red may be signaled. This further enhances the game possibilities since the user may intuitively be redirected to the right track, without having to read maps. The light unit response depending on the electronic compass indication may be activated in response to the gesture module 26, in particular, when the gesture module senses that the torch is tilted. This prevents in adverted signaling due to rotations or movements of the torch 20 when used. Specifically, the gesture module 26 may comprise a tilt sensor and/or acceleration sensor (not shown).

The invention is not limited to only light as output, but covers sound (sounds capes), smell, vibration and tactile output as additional game modalities as well. In particular, the torch 20 may comprise an acoustic unit (preferably including a loudspeaker 22) and/or a vibrational unit 23 activatable in response to the controller 3. The torch 20 may further include batteries and a game port 8 to load track data; game software etc.

Furthermore, where the embodiment discusses an elongated torch like body, other embodiments may be feasible, wherein, for example, the functionality is incorporated in a light ball, spectacles or a hat.

Additional features may include:

Touching of an interactive 'poster' to select a game or new assignment. This can also be triggered by entering a GPS location or pointing in a certain direction using the digital compass.

Touching of torches to hand over items from the inventory, activate things, battle against each other, forward a color, give a function to somebody else et cetera.

Use gestures to throw (virtual) things to a direction. E.g. a magic spell.

Use the torch to set out a route.

Shake gesture to lose items from the inventory.

Dimming the light (and turning it on again) by blowing or covering it with your hands The invention also covers a combination of these game features. More in particular, it may be understood that the invention also covers embodiments, without express indication to the contrary, of combined features as described here above.

The invention claimed is:

1. A location based gaming device, said gaming device comprising:
   a body;
   a location control unit arranged in the body, arranged to output location data of the device;

a light unit arranged in the body comprising light sources arranged for displaying a light characteristic; and a controller adapted to control said light unit, the controller comprising a memory to store track data; wherein the controller is arranged to change a light characteristic of the light unit indicative of on track and off track conditions of the device based on a proximity function between the track data and the location data.

2. The gaming device according to claim 1, wherein the body is an elongated proximally handheld body and wherein a light unit is arranged at a distal side of the body, the body further comprising an electronic compass unit, arranged to output compass directional data; and wherein the controller further controls the light unit as a function of stored track directional data indicating a sequence of locations related to the stored track data.

3. The gaming device according to claim 2, wherein a plurality of compass units are arranged at an angle respective to each other, and wherein the controller is arranged to select a compass unit that is oriented in a functional working condition.

4. The gaming device, according to claim 1, wherein the controlled light characteristic includes one of a light color, intensity and light pattern.

5. The gaming device according to claim 2, wherein the on track condition comprises an on track location mode provided by a high light unit intensity compared to an off track mode; and an on track direction mode provided by a predetermined on track direction color different from an off track direction color.

6. The gaming device according to claim 1, wherein the track data comprise a sequence of locations and/or directions of a predetermined track.

7. The gaming device according to claim 1, wherein the proximity function is dependent on a difference between the location data and predetermined track location; and a difference between directional data and predetermined track directional data indicating a sequence of locations related to the stored track data.

8. The gaming device according to claim 1, further comprising a gesture recognition module for detecting predefined gestures; the controller further arranged to control the light characteristic as a function of a detected gesture.

9. The gaming device according to claim 8, wherein the gesture recognition module comprises a tilt sensor and/or an acceleration sensor.

10. The gaming device according to claim 1, further comprising an acoustic unit and/or a vibrational unit activatable in response to the controller.

11. The gaming device according to claim 1, further comprising a controller switch and/or a controller data port to select a number of controller game modes.

12. The gaming device according to claim 1, wherein light sources are formed as LED multiplets, said LED multiplets arranged to provide compositions of multispectral light, controlled by the controller.

13. A system comprising:
 a gaming device including:
  a location control unit arranged to output location data of the device,
  a light unit comprising light sources arranged for displaying a light characteristic, and
  a controller adapted to control said light unit, and including a memory to store track data, with the controller arranged to change a light characteristic of the light unit indicative of on track and off track conditions of the device based on a proximity function between the track data and the location data; and
 a computing device having a communication unit to communicate with the gaming device, the computing device arranged to compute at least a location of the gaming device.

14. The system according to claim 13, wherein the communication unit is a two way communication unit, and wherein the computing device is arranged to instruct the controller of the gaming device.

15. The system according to claim 13, wherein the gaming device is one of a plurality of gaming devices communicatively coupled to the computing device.

* * * * *